Sept. 21, 1926.  
W. SUDHÖLTER  
1,600,523  
SADDLE FOR BICYCLES, MOTOR BICYCLES, AND THE LIKE  
Filed Nov. 17, 1925    2 Sheets-Sheet 1

Witnesses:

Inventor:  
Wilhelm Sudhölter

Sept. 21, 1926.  W. SUDHÖLTER  1,600,523
SADDLE FOR BICYCLES, MOTOR BICYCLES, AND THE LIKE
Filed Nov. 17, 1925   2 Sheets-Sheet 2

Patented Sept. 21, 1926.

1,600,523

UNITED STATES PATENT OFFICE.

WILHELM SUDHÖLTER, OF BIELEFELD, GERMANY, ASSIGNOR TO WITTKOP & CO., OF BIELEFELD, GERMANY.

SADDLE FOR BICYCLES, MOTOR BICYCLES, AND THE LIKE.

Application filed November 17, 1925, Serial No. 69,659, and in Germany August 19, 1925.

This invention relates to an improvement in a saddle for bicycles, motor bicycles and the like, of the kind having a seat consisting of a net work of spiral springs or other elastic means attached at one end to the resiliently mounted saddle tail and at the other end to a rearwardly directed tongue connected with the pivotally mounted saddle peak, and the novelty consists, in so arranging said tongue that it projects like a spring freely toward the saddle tail in such a way that between it and the latter a space is left, and in so connecting the saddle tail with the saddle peak by means of a bridge that said peak can yield but little only in rearward direction.

Figure 1:
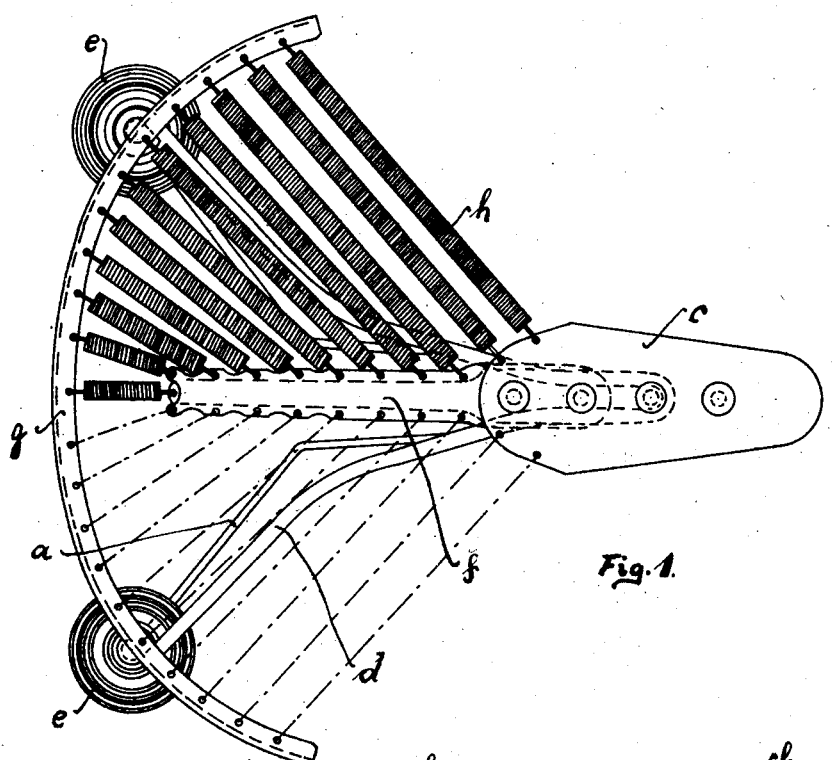
Figure 2:
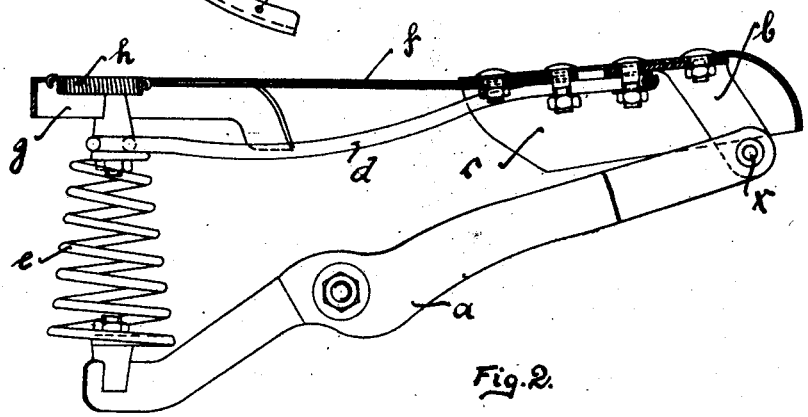
Figure 3:
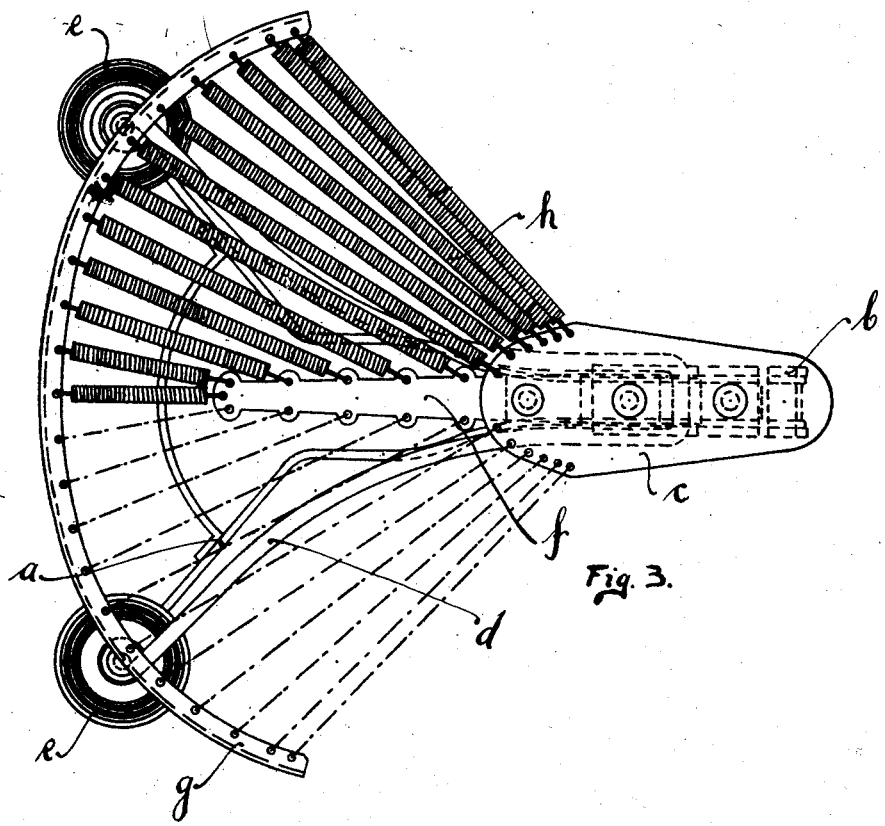
Figure 4:
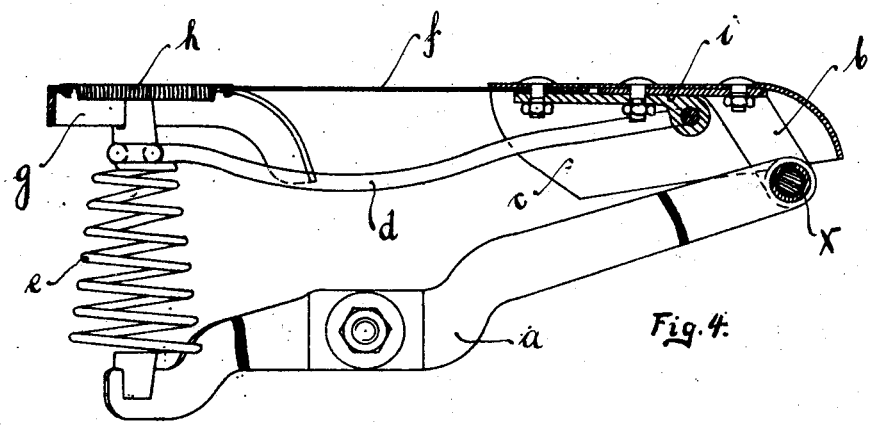

The accompanying drawings illustrate the improved saddle: Figs. 1 and 2 are respectively a plan view and a sectional side view of the same, while Figs. 3 and 4 are similar views to the former of a modification thereof.

The saddle supporting frame $a$ carries the saddle head $b$ which is pivoted thereto at $x$, while the saddle peak $c$ is firmly connected with said head. The saddle head thus formed is by a bridge $d$ connected with the rear supporting springs $e$ bearing upon the rear end of the supporting frame $a$. Furthermore, on the saddle head a springy tongue $f$ is arranged which extends in rearward direction toward the saddle tail $g$ bearing upon the supporting springs $e$, said tongue being preferably tapered in rearward direction and terminating at a distance from the saddle tail $g$. The seat coil springs $h$ of yielding length are attached to said saddle tail $g$ and to said tongue $f$ and saddle peak $c$ respectively.

If desired, the tongue $f$ can be made of two or more parts to suit the desired size and elasticity of the saddle.

By the rigid connection between saddle peak $c$ and bridge $d$ the front part of the saddle is, even in the event of shocks, exposed to a very slight tilting movement only, while the arrangement of the tongue $f$ on the saddle locates the highest elasticity of the seat, with the aid of the supporting springs $e$, toward the back of the same where it is actually weighted by the body of the driver, said elasticity being then gradually decreased toward the front end of the saddle. A slipping of the driver's body to the front in the event of shocks, and the inconvenience resulting therefrom, are avoided.

To further increase the spring action of the saddle, as shown in Figs. 3 and 4, the bridge $d$ can be pivotally connected at $i$ with the peak $c$, so that by a pressure upon the saddle and a consequent tilting of the peak $c$ on the pivot $x$ a rearward pushing of the bridge $d$ and thus of the frame $g$ is effected whereby the seat springs $h$ are tensioned.

What I claim, is:—

1. In a saddle for bicycles and the like, the combination of a resiliently mounted saddle tail, a pivotally mounted saddle peak, a rearwardly directed tongue connected with the latter and projecting like a spring freely toward the saddle tail in such a way that between it and the latter a space is left, a seat consisting of a network of elastic means attached at one end to said tail and at the other end to said tongue and peak, and a bridge connecting said saddle tail and said saddle peak so that the latter can yield but little only in rearward direction.

2. A saddle as specified in claim 1, in which said bridge is in pivotal connection with said saddle peak.

In testimony whereof I have hereunto set my hand.

WILHELM SUDHÖLTER.